United States Patent [19]

Wahl, III

[11] 4,027,483

[45] June 7, 1977

[54] DEVICE FOR CONVERTING INTERNAL ENERGY OF HOT FLUIDS TO SHAFT WORK

[75] Inventor: Edward F. Wahl, III, Claremont, Calif.

[73] Assignee: Occidental Petroleum Corporation, Los Angeles, Calif.

[22] Filed: Aug. 18, 1975

[21] Appl. No.: 605,289

[52] U.S. Cl. .................................. 60/641; 60/650; 60/682; 60/690; 415/80

[51] Int. Cl.² .................... F03G 7/00; F01K 25/00; F01D 1/18

[58] Field of Search ............... 415/80; 60/641, 643, 60/645, 670, 721, 690, 692, 650, 682

[56] References Cited

UNITED STATES PATENTS

| | | | |
|---|---|---|---|
| 999,776 | 8/1911 | Gill | 415/80 |
| 1,454,286 | 5/1923 | Johnson | 415/80 |
| 3,147,951 | 9/1964 | Cain, Jr. et al. | 415/80 |

Primary Examiner—Allen M. Ostrager
Attorney, Agent, or Firm—Max Geldin; William N. Patrick; William G. Lane

[57] ABSTRACT

Apparatus to convert the internal energy of hot fluids to mechanical work comprising a pair of nozzles, e.g. convergent-divergent nozzles, mounted oppositely on hollow support arms which are in turn mounted on a rotating hollow shaft which is coupled to a conventional electric generator or other device requiring mechanical power. The hot liquid, e.g. hot brine, flows through the hollow shaft and the hollow support arms to the nozzles, where the hot fluid expands and creates a thrust and torque on the shaft, causing it to rotate and create shaft power. The nozzles and rotating shaft are mounted in a closed container from which the exhaust fluid, gases and liquid are removed by conventional means so as to maintain a reduced pressure within the container.

47 Claims, 6 Drawing Figures

DEVICE FOR CONVERTING INTERNAL ENERGY OF HOT FLUIDS TO SHAFT WORK

BACKGROUND OF THE INVENTION

This invention relates to the conversion of heat energy from hot fluids into mechanical work, and is particularly concerned with the conversion of heat energy from hot liquids, particularly geothermal brine, to shaft work by means of nozzles, and with apparatus and procedure for this purpose.

Geothermal brines constitute a major store of energy. The temperature of the brines are typically up to about 400° F and in some cases are at higher temperatures up to about 600° F. Conversion of the internal heat energy of geothermal brine to mechanical or electrical energy is a relatively recent development which has begun to assume considerable importance. Most installations for this purpose have involved the use of equipment designed and built for the commonly employed high temperature energy sources, such as the combustion energy of coal, oil, gas, and the like. The relatively low brine temperature, however, limits the available energy per pound of fluid processed. Further, geothermal brines contain dissolved minerals and salts so that the equipment used for transport and processing present corrosion and/or scaling problems as a result of contact with the geothermal brines. In addition, conventional equipment designed for obtaining energy as by generating electricity, employing convention energy sources such as coal, oil and gas, are complex and involve a high capital cost.

Low temperature, e.g. 300° to 600° F heat sources such as geothermal brines, have a sufficiently lower theoretical limiting conversion of heat energy to work so that much larger fluid rates are required per unit work output, and thus conventional expansion equipment has a greater fraction of frictional losses as well as capital cost as result of its complexity as compared with a nozzle.

Hence, an energy conversion device for converting the heat energy of geothermal brines to mechanical work is therefore required which is simple, efficient, has a low capital cost and which particularly has a minimum surface in contact with the brine, so as to minimize scaling problems.

A. L. Austin et al in the publication "The Total Flow Concept for Recovery of Energy from Geothermal Hot Brine Deposits," UCRL-51366, April, 1973, have proposed expanding the brine through nozzles arranged to impinge this stream on turbine blades to recover the kinetic energy. This approach has two disadvantages, firstly the nozzles are limited in size and consequently the efficiency will be limited because of losses due to non-acceleration of the liquid droplets and drag on the droplets. Secondly, there will be inefficiencies due to fluid friction associated with recovering the kinetic energy of the nozzle exhaust with the turbine blades.

Another approach of the prior art is the helical screw expander, which is essentially a helical screw compressor operated in reverse. This device is limited substantially to a 3 to 1 pressure expansion ratio. Since recovery of internal energy from, for example, 350° F geothermal brines requires an expansion ratio of say 20 to 1, several machines of this type in series would be required. The disadvantages of this device chiefly its complexity, massiveness and cost.

Accordingly, the chief object of the present invention is the design of a device for conversion of the heat energy of hot fluids, particularly geothermal brines, efficiently and employing a simple device, namely the nozzle, requiring low capital investment and having a very small surface area in contact with the hot fluid, and which in contrast to the above Austin et al system, does not require use of a turbine with its high cost and inefficiencies as noted above, to recover the kinetic energy. A further object is the provision of efficient procedure for the conversion of the heat energy of such hot fluids.

DESCRIPTION OF THE INVENTION

The above objects and advantages are achieved according to the invention by the provision of a device which comprises an expansion means in the form of at least one pair of nozzles, preferably of the convergent-divergent type, mounted oppositely on a hollow rotating shaft through which a hot fluid, e.g. brine, flows and which is in communication with the nozzles, passage of the hot fluid through the nozzles and discharge therefrom thus delivering thrust or torque to the shaft which by proper coupling, e.g. to a conventional generator, is thus available for conversion to mechanical work or electric power.

Hot brine flows from the wells through the central shaft and out through a pair of rotating arms on which the nozzles are oppositely mounted, to the nozzles, where the hot brine expands in the nozzle to convert its heat energy to kinetic energy. The associated momentum change creates a thrust and torque which creates the shaft power. The nozzles and rotating shaft are mounted in a closed container from which the exhaust steam, gasses and liquid can be removed by conventional means so as to maintain a reduced pressure within the container. However, in certain instances, as for example where the exhaust is to be used for process heat, the container can be at pressures higher than atmospheric pressure.

The nozzle is a simple device, requiring low capital investment and has a very small surface area in contact with the fluid. The power output depends on the enthalpy change of the fluid through the nozzle, which in turn depends on the brine inlet temperature and the exhaust pressure. By use of such expansion device procedure is provided to accelerate the fluid stream including gas, liquid and slids, if any, so as to maximize the power output from the fluid. Thus, according to the invention, the higher density liquid and solid particles, if any, in the fluid stream, are accelarated during passage through the expansion device or nozzle, to a velocity of at least 50%, and preferably of at least 75%, of the velocity of the lighter density gas in the fluid stream, at the discharge end of the expansion device or nozzle. Thus, for example, in a typical fluid stream passing through the expansion device, and containing liquid brine droplets and water vapor and non-condensible gases, the final velocity of the liquid brine droplets was 1,500 ft/second and of the gaseous components, about 2,600 ft/second. In preferred practice the gas, liquid and solids, if any, are accelerated so that all of these components have substantially the same velocity at the same point throughout the expansion process, to maximize the efficiency of energy conversion.

Since the main contacting surface for the brine in the device of the invention are the nozzles, and the nozzles have a very small surface area in contact with the fluid or brine, scaling problems are substantially reduced. Additional advantages are the efficiency, simplicity in terms of the number of components, and substantially reduced capital cost of the equipment according to the invention.

The nozzles and rotating shaft are mounted in a closed container from which the exhaust steam, gases and liquid can be removed by conventional means so as to maintain a reduced pressure within the closed container in usual operation. To obtain such vacuum, a condenser and gas ejector or some other type of gas vacuum pump are required.

In preferred practice, means such as a separating wall and baffles are disposed within the container and around the nozzles and rotating shaft, to permit recovery of pure condensate, e.g. brine, separately from water.

The device of the invention will be more clearly understood from the detailed description of a preferred embodiment of the invention, taken in connection with the accompanying drawing wherein:

FIG. 5 is a sectional detail of a bearing and seal structure in the device of FIG. 1.

Figure 1:
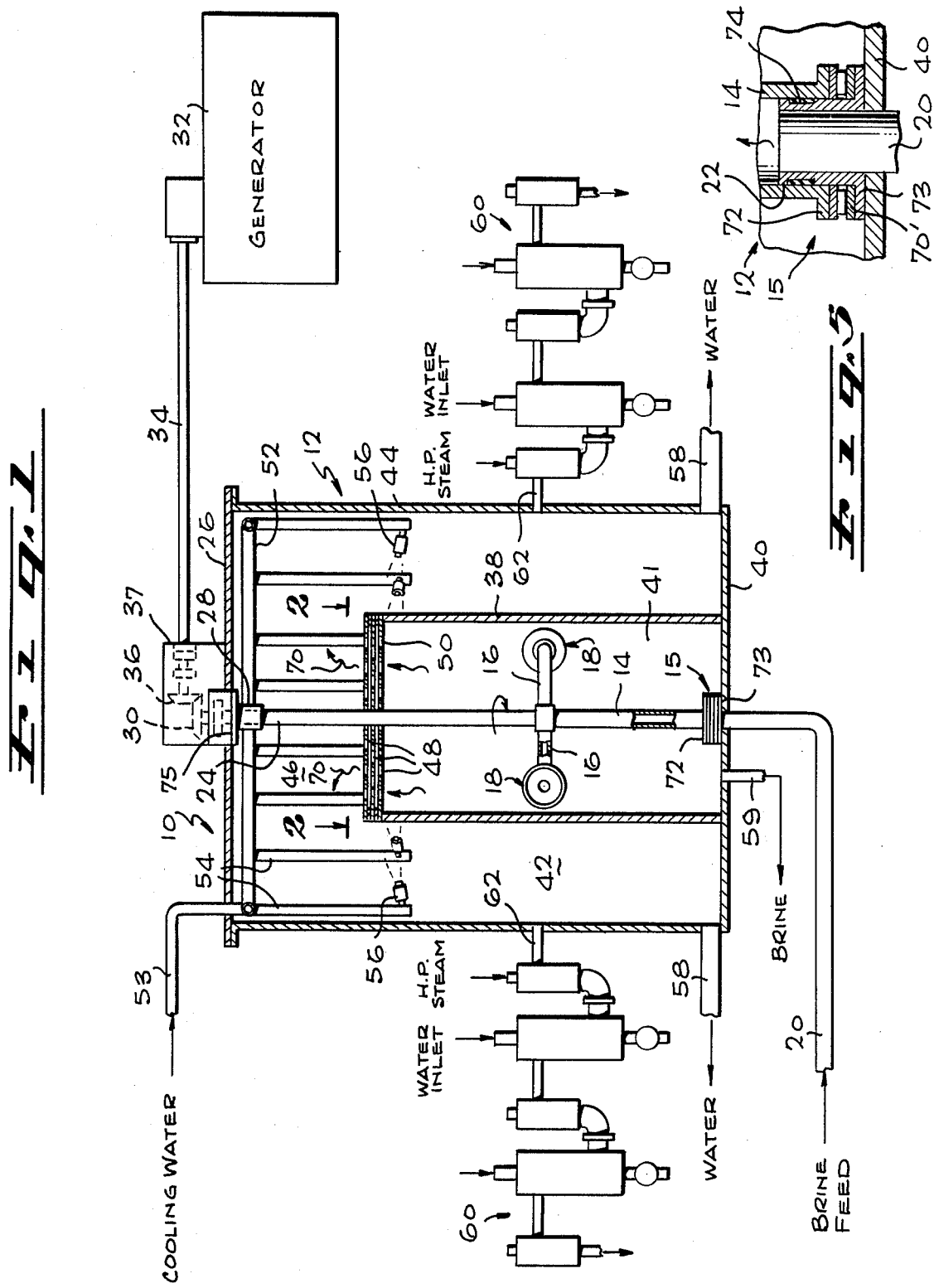
FIG. 1 is a sectional elevation of a device according to the invention.

Referring to FIG. 1 of the drawing, numeral 10 designates the apparatus of the invention, including an enclosed container or vessel 12, shown as cylindrical in shape, having mounted axially therein a rotatable hollow shaft 14 suitably supported in a bearing assembly 15 at the bottom of the container. Mounted on the hollow shaft 14 for rotation therewith are a pair of transverse hollow support arms 16 positioned in alignment with each other on opposite sides of the hollow shaft 14, the hollow support arms being in fluid communication with the hollow shaft 14.

Figure 2:
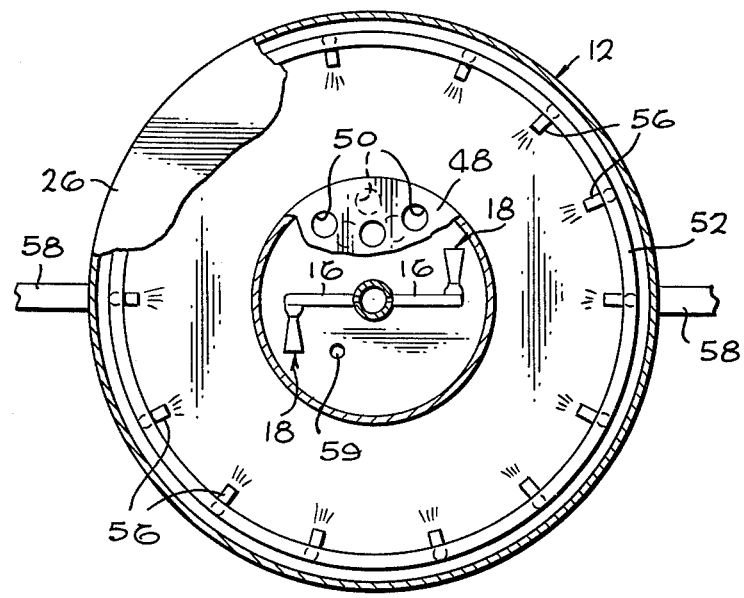
FIG. 2 is a plan view of FIG. 1, with the cover partially broken away for greater clarity.

At opposite ends of the hollow support arms 16 are mounted a pair of convergent-divergent nozzles 18 each in fluid communication with the support arms 16, the nozzles being mounted in oppositely facing directions on the respective support arms 16, as best seen in FIG. 2. The axis of each of the nozzles 18 is in the same plane as the axis of the hollow support arms 16, and such plane is normal to the axis of the rotatable hollow shaft 14. The design and construction of the convergent-divergent nozzles 18 are discussed in greater detail hereinafter.

In inlet conduit 20 is provided for the hot brine feed or other hot liquid, such conduit being suitably connected to and in communication with the lower end of the rotatable hollow shaft 14, via a sealing element 22 mounted at the lower end of shaft 14. The upper end 24 of the rotatable shaft 14 extends through the top cover 26 of the vessel 12 via a seal 28 (see FIG. 5) which also functions as a bearing to support the shaft in a fixed axial position, a bevel gear 30 being mounted on the upper end of the shaft 14. The upper part 24 of the shaft 14 is capable of transmitting the work generated by rotation of the shaft to an electrical generator 32 or other mechanical work consuming device, via a shaft 34 having mounted at its outer end a second bevel gear 36 in operative engagement with the gear 30. The bevel gear mechanism 30, 36 is contained within a housing 37 suitably mounted on the container or vessel 12.

Within the container 12 and positioned around the rotatable hollow shaft 14, the associated hollow support arms 16 and the oppositely positioned converging-diverging nozzles 18 mounted thereon, is a ring shaped or cylindrical wall 38 which extends from the bottom 40 of the container 12, a distance upwardly substantially above the support arms 16 and the nozzles 18 thereon, but below the cover 26 of the container. Thus, the cylindrical wall 38 can extend upwardly from the bottom of container 12, a vertical distance of about 80% of the height of the container 12. The cylindrical wall 38 forms an enclosure 41 which functions as an exhaust section which receives the mixture of gas an entrained fluid droplets discharged from the nozzles 18. The cylindrical wall 38 has a diameter substantially less than the inside diameter of the container 12, leaving an annular space or condense section 42 between the outer wall 44 of the container or vessel 12 and the cylindrical inner wall 38. A vapor space 46 is also provided in the upper portion of the vessel 12 between the upper end of the cylindrical wall 38 and the top 26 of the container 12. The cylindrical wall 38 is of a diameter which provides sufficient clearance between the nozzles 18 and the wall 38 to permit free discharge of fluid from the nozzles into the enclosure 41.

Figure 3:
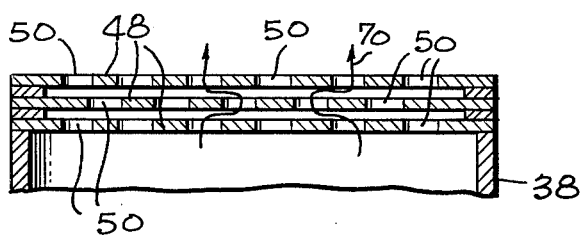
FIG. 3 is a sectional detail of the baffles employed in the device of FIG. 1.

At the upper end of the inner cylindrical wall 38 is mounted a plurality, here shown as three in number, of baffles 48 in the form of flat plates, as shown in greater detail in FIG. 3. each having a plurality of random holes or aperatures 50, the holes 50 in adjacent plates 48 preferably being positioned in non-aligned or staggered relation, as indicated in FIGS. 2 and 3 of the drawing. The holes 50 in the respective baffles 48 are designed to increase the separation of gas and liquid droplets in the gas-liquid droplet mixture discharged into the space 41 formed by cylindrical wall 38, as the mixture flows upwardly via the aperatures 50, and the gas or vapor therein passes into the upper vapor space 46 of the vessel 12

A header 52 is provided around the upper periphery of the vessel 12 with an inlet 53 thereto for liquid coolant, e.g. cooling water, the header having connected thereto a plurality of depending pipes 54 which extend down into the annular space or condenser section 42, the lower ends of the pipes 54 each being fitted with a spray nozzle 56 for spraying coolant into the condenser section.

Water outlet conduits 58 are provided at the lower end of the outer wall 44 of the vessel 12, for removal of condensed water vapor in the condenser section 42 within the vessel, and a brine outlet conduit 59 is provided for removal of brine concentrate from the exhaust section 41 formed by wall 38. The vessel 12 is provided with a conventional steam ejector system, indicated generally at 60, which communicates via pipes 62 with the interior of the vessel 12, for maintaining a vacuum in the vessel.

Figure 4A:
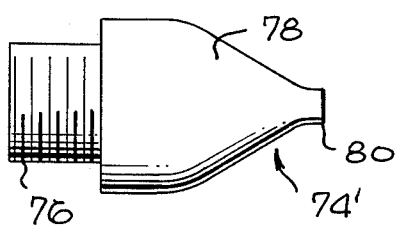
FIG. 4a is a side elevation of a modification in the form of a convergent nozzle.
Figure 4:
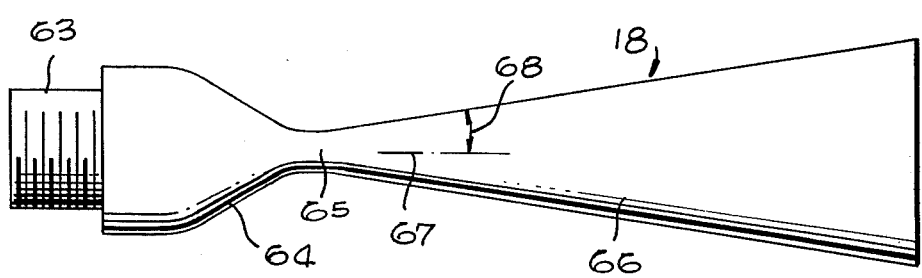
FIG. 4 is a side elevation of the convergent-divergent nozzles in the device of FIG. 1.

In operation, the hot fluid, for example a geothermal brine at temperature between 300° and 600° F., e.g. 350° F, flows through the conduit 20, e.g. at a flow rate of 2,000 gallons per minute, into the rotating hollow shaft 14 and out through the hollow support arms 16 to the nozzles 18. Referring now to both FIGS. 1 and 4 of the drawing, each of the nozzles 18 has a threaded portion 63 for attachment to the end of a support arm 16, converging section 64 in communication with the interior of support arms 16 via the threaded portion 63, a throat 65, and a diverging section 66, so that the expanding gas can reach supersonic velocities relative to the nozzle. In the coverging section 64 a portion of the incoming hot brine liquid from the hollow support arms will flash to a gas so that in a short distance the nature of the fluid will change from that of a liquid, or liquid containing gas bubbles, to a gas containing liquid droplets. For this purpose there should be a temperature differential of say between about 100° and about 300° F between the injection temperature of the hot brine and the temperature of the condenser section 42 of the system. As previously noted, the power output of the system depends on the enthalpy change of the fluid through the nozzle, which in turn depends on the brine inlet temperature and the exhaust pressure.

The nozzle 18 must be sufficient length in order that the acceleration of the gas is sufficiently low so that the liquid droplets can be accelerated to a velocity near the gas velocity. Such acceleration of the fluid stream, including gas and liquid droplets, by the nozzles or expansion devices, maximizes the power input from the fluid stream. Calculations show that the length of the nozzle should be a foot or more, e.g. ranging from about 1 to about 20 feet, and preferably about 5 to about 10 feet. This length also depends on the droplet size, discussed in further detail below. The throat diameter of the nozzle 18 can range from about 0.01 to about 1 foot, preferably about 0.1 to about 0.5 foot. The nozzle 18 has a diverging section 66 with an angle 68 of the wall of the diverging section of the nozzle with its axis 67, of about 10 to about 15°, preferably about 10° to about 12°. The requirements of length and angle, as well as wall-fluid drag considerations means that the liquid flow rate to each of the nozzles 18 should be about 50 gallons per minute or more, up to about 2,000 gallons per minute, and preferably about 500 to about 2,000 gallons per minute.

The coverging section 64 of the nozzle should be constructed so as to cause the droplets formed to be of the smallest possible size, preferably of the order of 0.01 inch in diameter or smaller. Also, the chemical composition of the hot liquid feed can be altered so as to change the liquid-gas surface tension and so alter the droplet size.

The exhaust from the nozzles 18 is separated from the condenser section 42 by the cylindrical wall 38. The liquid droplets thus discharged from the nozzles will fall by gravity to the bottom of the exhaust section 41 within the cylindrical enclosure 38. This liquid at the bottom of the exhaust section 41, and which is comprised of liquid brine of a higher concentration than the feed brine, is removed through brine outlet conduit 59. The steam and non-condensible gases flow upwardly through the apertures 50 in baffles 48, and into the upper vapor space 46 within the vessel 12 and then outwardly toward the inner periphery of the vessel 12 into the condenser section 42, as indicated by arrows 70. The apertured baffles 48 function to increase the separation of the liquid droplets of brine from the gas. Separators other than baffles can be employed, such as packed beds or fibrous material.

Coolant or cooling water flowing through the header 52 and sprayed through the spray nozzles 56 into the condenser section 42 causes the steam to condense, the condensate being removed via the water outlet conduits 58. In place of employing spray nozzles with direct contact of the coolant or cooling water with the steam, the steam in the condenser section 42 can be condensed on conventional heat exchanger tubes which can be provided in such condenser section. Non-condensible gases are removed via pipes 62 by the steam ejector system 60, employing high pressure steam, which in conjunction with the condensing system maintains a vacuum within the vessel 12. In place of a steam ejector, some other conventional type of gas vacuum pump can be employed.

The chemical composition of the geothermal brine feed at 20 can vary considerably. Thus, for example such hot brine can contain combinations of sodium, potassium and calcium chlorides in varying proportions, and the concentration of the brine can also vary from dilute brines having a mineral concentration of about 0.1% to concentrated brines, e.g. up to about 30%, such brines usually having a mineral concentration of about 1 to about 5 percent. The flow rate of the brine feed, as previously noted, can range from about 50 to about 2,000 gallons per minute.

The device of the invention will operate for producing mechanical work, whether the fluid entering the nozzles 18 is all liquid, all gas or a combination thereof. In the case of a gas, however, the design requirements are simplified because there are no liquid droplets present to be accelerated.

Under certain operating conditions such as, for example, inlet pressure to the nozzles of 80 psig and outlet pressure of 30 psig, in place of employing the convergent-divergent nozzles described above, there can be employed a simplified nozzle having only a convergent section. Such convergent nozzle is illustrated at 74' in FIG. 4a, and has a threaded section 76, a convergent section 78 and a discharge end 80. Such nozzle can range in length from about one inch to about 6 ft. in length, and the nozzle wall can converge at an angle ranging from about 10° to about 60°, usually about 30° to about 60°, with its axis.

The separating cylindrical wall 38 and baffles 48 are not necessary in the invention device, but in the case of the use of a brine feed, the inclusion of these components permits separation of the liquid brine droplets in the discharge from the nozzles 18, from the gas containing water vapor, thus rendering the device useful for recovering pure condensate, that is water at 58, separately from the liquid brine concentrate at 59. This feature is useful, for example, for producing fresh water from the brine fed to the system.

Further, a condenser and gas ejector are not necessary under certain conditions of operation. Thus, for example, the interior of the vessel 12 can be pressurized instead of placed under vacuum. Such a system would permit the production of pressurized steam, instead of water, and such steam could be employed for providing power and the resulting low pressure discharge steam employed for space heating.

It will be understood that various further modifications of the invention can also be practiced. Thus, instead of employing a single pair of aligned support arms 16 and oppositely positioned nozzles 18, there can be employed a plurality of such pairs or sets of aligned support arms and nozzles. Thus, for example the device described above and shown in the drawings can employ two pairs of such aligned hollow support arms 16 an nozzles 18, spaced vertically aong the hollow shaft 14, and the axis of the support arms for each of the respective pairs of spaced support arms can be in the same or in separate vertical planes, that is, the respective pairs of aligned support arms can be angularly displaced from each other at an angle varying from 0° up to 180°.

Means can be employed to cause the hot fluid to rotate spirally as the fluid enters the nozzles 18 and expands, to increase holdup time of the droplets and/or increase the separation of the gas and liquid. Further, boundary layer fluids can be employed to prevent scaling at the walls of the nozzles 18 by deposition of minerals from the hot brine, as for example by injection of mineral-free water around the periphery of the inner surface of the nozzles. In addition, means can be employed for providing moving wall surfaces within the nozzles 18 to fracture scale formed so that such scale with fall the inner wall of the nozzles and be removed by the exhaust gas stream.

It will be understood that the outer container 12 can be of any desired shape such as cylindrical, spherical, square or polygonal, and the wall 38 for the exhaust section can similarly be of any configuration so long as it is generally ring shaped to form an enclosure around the nozzles 18, with sufficient clearance provided between the nozzle outlets and the enclosing wall such that there is no interference of flow from the nozzle discharge.

Also, if desired, the location of the brine inlet 20 and the shaft power take-off elements 30, 36 and 34 can be reversed, with the brine inlet 20 at the top and the take-off elements at the bottom.

Any suitable type of bearing assembly 15 and seals 22 and 28 can be provided for the connection of the rotatable shaft 14 at one end thereof to the brine feed conduit 20, and for passage of the opposite end of the rotatable shaft through the top of the container. Thus, as seen in FIG. 5, the bearing assembly 15 can comprise a roller bearing 70' mounted within a flange 72 at the lower end of rotatable shaft 14, and a flange 73 mounted at the lower end of sealing element 22 and which is connected to the bottom of container 12. The sealing element 22 includes an O-ring seal 74. The seal 28 (see FIG. 1) is in the form of a collar sealing the upper end of rotatable shaft 14, and connected by a flange 75 to th cover 26.

The following are examples of practice of the invention.

EXAMPLE 1

Hot brine water at 312° from, for example, a geothermal well, is pumped at 4,000 gpm into a device as described above but with four nozzles, that is, two pairs of nozzles 18, each of outlet diameter 1.1 feet, length 7.6 feet, and throat diameter 0.15 feet. The exhaust pressure is maintained at a vacuum of 0.97 psia by condensing the exhaust at 101° F. The linear velocity of the nozzles is 1140 feet per second. The shaft work produced is 14 megawatts. Using this to drive an electrical turbine, the electrical power production would be 12.6 megawatts.

EXAMPLE 2

Hot brine water at 401° F from geothermal wells is pumped into a device as described above and consisting of four nozzles as noted in Example 1, each of outlet diameter 1.06 feet, throat diameter 0.35 feet, and length 6 feet. The brine is pumped into the unit at 12,000 gallons per minute. The exhaust from the nozzles is at 210° F and 14.21 psia. Cool water at 150° F is used to condense the exhaust steam in a direct contact condenser such as the device descirbed above. This heats the water to 180° and it is then pumped into a distribution system to supply space or process heat in the amount of $5764 \times 10^6$ Btu/hr which is equivalent to 1,600 megawatts. The shaft power of 33.1 megawatts produced by the thrust from the nozzles is used to turn an electrical generator to produce electrical power in the amount of 29.8 megawatts.

From the foregoing, it is seen that the invention provides a novel and relatively simple device or system for converting the internal energy of hot fluids such as geothermal brines, into mechanical work. The device, consisting chiefly of a hollow rotatable shaft for passage of the hot fluid therethrough and nozzles mounted on the rotatable shaft for delivering thrust to the shaft by passage of the hot fluid therethrough, and such shaft coupled to drive any device requiring mechanical power, has relatively few components and hence can be readily constructed from available materials at low cost. Of particular significance, the invention device depends only upon the nozzles for directly generating shaft power, has a very small surface area, and has essentially only the internal surface area of the nozzles in contact with the fluid, causing minimum scaling problems.

While I have described particular embodiments of my invention for purposes of illustration, it is understood that other modifications and variations will occur to those skilled in the art, and the invention accordingly is not to be taken as limited except by the scope of the appended claims.

What is claimed is:

1. A device for converting the internal energy of hot fluids to mechanical work, which comprises a container, hollow rotatable shaft means mounted within said container, conduit means communicating with one end of said shaft means for feeding a hot liquid into said hollow shaft means, means connecting said conduit means and said one end of said shaft means, fluid expansion means mounted on said rotatable shaft means and capable of rotating said shaft means, means for feeding hot liquid from said hollow shaft means to said fluid expansion means, passage of said hot liquid through said expansion means and discharge therefrom being capable of delivering a rotary thrust to said hollow shaft means and causing rotation thereof, transmitting means for transmitting the work generated by said rotatable shaft means to a machine, said transmitting means connected to said shaft means, and means for removing fluid discharged from said expansion means, from said container.

2. A device for converting the internal energy of hot fluids to mechanical work, which comprises a container, hollow rotatable shaft means mounted within said container, conduit means communicating with one end of said shaft means for feeding a hot liquid into said hollow shaft means, means connecting said conduit means and said one end of said shaft means, means sealing the connection between said conduit means and said rotatable shaft means, at least one pair of nozzles mounted oppositely on said rotatable shaft means, means for feeding hot liquid from said hollow shaft means to said nozzles, passage of said hot liquid through said nozzles and discharge therefrom being capable of delivering a rotary thrust to said hollow shaft means and causing rotation thereof, transmitting means for transmitting the work generated by said rotatable shaft means to a machine, said transmitting means connected to said shaft means, and means for removing fluid discharged from said nozzles, from said container.

3. A device as defined in claim 2, said nozzles being convergent-divergent nozzles having a convergent section and a divergent section, said means for feeding said hot liquid from said hollow shaft means to said nozzles communicating with the inlet to the convergent section of said nozzles.

4. A device as defined in claim 3, said last mentioned means comprising a pair of hollow support arms mounted on said shaft means, said nozzles being mounted on opposite end of said support arms.

5. A device as defined in claim 4, said convergent-divergent nozzles each having a length ranging from about 1 to about 20 feet, the diverging section of each of said nozzles having an angle of the wall of said section with its axis of about 10° to about 15°.

6. A device as defined in claim 5, said angle being about 10° to about 12°, and said length ranging from about 5 to about 10 feet.

7. A device as define in claim 5, the throat diameter of said nozzles ranging from about 0.01 to about 1 foot.

8. A device as defined in claim 2, said nozzles being convergent nozzles, said means for feeding said hot liquid from said hollow shaft means to said nozzles communicating with the inlet to said convergent nozzles.

9. A device as defined in claim 8, said last mentioned means comprising a pair of hollow support arms mounted on said shaft means, said nozzles being mounted on opposite ends of said support arms.

10. A device as defined in claim 9, said convergent nozzles each having a length ranging from about 1 inch to about 6 feet, the nozzle wall of each of said nozzles converging at an angle ranging from about 10° to about 60°, with its axis.

11. A device as defined in claim 10, said angle being about 30° to about 60°.

12. A device for converting the internal energy of hot fluids to mechanical work, which comprises a closed container, a hollow rotatable shaft mounted substantially axially within said container, a feed conduit connected to and communicating with said hollow shaft for externally feeding a hot fluid into one end of said hollow shaft, at least one pair of hollow support arms mounted on said shaft within said container, said at least one pair of support arms extending in alignment with each other on opposite sides of said shaft, said hollow support arms being in fluid communication with said hollow shaft, at least one pair of nozzles mounted on opposite ends of said at least one pair of support arms, said nozzles mounted in oppositely facing directions on said support arms, said nozzles being fluid communication with said respective hollow support arms, said nozzles being convergent-divergent nozzles having a convergent section and a divergent section, said convergent section of said nozzles being in fluid communication with said hollow support arms, a ring shaped wall section surrounding said rotatable shaft and said nozzles mounted thereon and forming an enclosure within said container, said wall section having a diameter substantially less than the periphery of said container and forming an annular space between said wall section and the inner surface of said container, said annular space being a condenser section, said wall section extending from the bottom of said container upwardly a substantial distance within said container but below the top of said container and forming a vapor space between the top of said wall section and the top of said container, a plurality of vertically spaced baffle plates mounted at the top of said section, each of said baffle plates containing apertures, the apertures in adjacent baffle plates being displaced from each other, said baffle plates causing separation of liquid droplets from vapor in the mixture discharged from said nozzles into the enclosure within said wall section, and causing said liquid droplets to fall to the bottom of said enclosure, and permitting gases and vapors to pass from said enclosure upwardly through said apertures into said vapor space above said baffle plates, a conduit for removing condensed liquid at the bottom of said container, a conduit for removing liquid from the bottom of said wall section, a cover on said container, said rotatable shaft extending through said cover, and transmitting means for transmitting the work generated by said rotatable shaft means to a machine, said transmitting means connected to said shaft.

13. A device as defined in claim 12, including means in communication with said condenser section in the interior of said container for maintaining a vacuum in said container.

14. A device as defined in claim 12, said nozzles each having a length ranging about 1 to about 20 feet, each of said nozzles having an angle to the wall of said section with the nozzle axis of about 10° to about 12°, the throat diameter of said nozzles ranging from about 0.01 to about 1 foot.

15. A device as defined in claim 14, including a header disposed around the upper periphery of said container, a conduit for introducing liquid coolant into said header, a plurality of pipes depending from said header into the upper peripheral space in space in said condenser section, said pipes being fluid communication with said header, a plurality of nozzles connected to the lower ends of said depending pipes and in fluid communication therewith, for spraying liquid coolant into said condenser section.

16. A device as defined in claim 15, including a steam ejector externally of said container for maintaining a vacuum in said container, and outlet pipe means in communication with said condenser section and said steam ejector.

17. A device as defined in claim 12, including bearing seals for said hollow rotatable shaft adjacent the bottom of said container and adjacent said container cover, said feed conduit being connected to the lower end of said hollow shaft at the bearing seal adjacent the bottom of said container, said device requiring mechanical power being an electric generator, said means connecting said rotatable shaft to said generator comprising gear means connected to the upper end of said shaft externally of said container.

18. Process for converting the internal energy of hot fluids to mechanical work, which comprises passing a hot liquid through an expansion device and accelerating the fluid stream passing through said device and discharged therefrom to provide substantially maximum power output from said device, and directly utilizing the resulting thrust provided by the expansion of the fluid in said expansion device to generate shaft power, and withdrawing the fluid discharged from said expansion device.

19. Process as defined in claim 18, wherein the higher density liquid and solid particles, if any, in said fluid stream are accelerated during passage through said expansion device, to a velocity of at least 50%, and preferably of at least 75%, of the velocity of the lighter density gas in said fluid stream, at the discharge end of said expansion device.

20. Process as defined in claim 18, wherein the gas, liquid and solids, if any, present in said fluid stream are accelerated during passage of said stream through said expansion device, so that all of said components have substantially the same velocity at the same point throughout the expansion process.

21. Process as defined in claim 18, said hot fluid being hot brine, the fluid discharged from said expansion device comprising liquid brine droplets and steam and non-condensible gases.

22. Process as defined in claim 20, there being a temperature differential of between about 100° and about 300° F between device and the temperature of said condensing zone.

23. Process as defined in claim 21, including collecting the concentrated brine liquid droplets discharged from said expansion device, and condensing the steam in said discharged fluid in a zone separate from said concentrated liquid brine.

24. Process as defined in claim 18, said expansion device comprising a nozzle including a constricted area for passage and acceleration of said fluid stream therethrough.

25. Process as defined in claim 24, said fluid being hot brine, the fluid discharged from said expansion device comprising liquid brine droplets and steam and non-condensible gases, including collecting the concentrated brine liquid droplets discharged from expansion device, and condensing the steam in said discharged fluid in a zone separate from said concentrated liquid brine.

26. Process as defined in claim 25, wherein the higher density liquid brine droplets in said fluid stream are accelerated during passage through said nozzle, to a velocity of at least 50%, and preferably of at least 75%, of the velocity of the lighter density steam an non-condensible gases in said fluid stream, at the discharge end of said nozzle.

27. Process as defined in claim 25, wherein the liquid brine droplets and steam and non-condensible gases are accelerated during passage of said fluid stream through said nozzle, so that all of said components substantially the same velocity at the same point throughout the expansion process.

28. A device for converting the internal energy of hot fluids to mechanical work, which comprises a container, hollow rotatable shaft means mounted within said container, means for feeding a hot fluid into said hollow shaft means, at least one pair of nozzles mounted oppositely on said rotatable shaft means, means for feeding hot fluid from said hollow shaft means to said nozzles, passage of said hot fluid through said nozzles and discharge therefrom being capable of delivering a rotary thrust to said hollow shaft means and causing rotation thereof, transmitting means for transmitting the work generated by said rotatable shaft means to a machine, said transmitting means connected to said shaft means, condensing means in said container for condensing vapors in the mixture discharged from said nozzles, and means for removing fluid discharged from said nozzles, from said container.

29. A device as defined in claime 28, including for maintaining a vacuum in said container.

30. A device as defined in claim 28, said condensing means comprising a plurality of spray nozzles positioned adjacent to the upper inner periphery of said container and means for feeding a liquid coolant to said spray nozzles.

31. A device as defined in claim 30, including a header mounted around the upper periphery of said container and a plurality of pipes connected to and in communication with said header, said spray nozzles being mounted on said respective pipes and in fluid communication therewith.

32. A device as defined in claim 29, said means for maintaining a vacuum in said container comprising steam ejector means.

33. A device as defined in claim 28, said nozzles being convergent-divergent nozzles having a convergent section and a divergent section, said means for feeding said hot liquid from said hollow shaft means to said nozzles communicating with the inlet to the convergent section of said nozzles, said last mentioned means comprising a pair of hollow support arms mounted on said shaft means, said nozzles being mounted on opposite ends of said support arms.

34. A device as defined in claim 33, including means for maintaining a vacuum in said container.

35. A device as defined in claim 33, said condensing means comprising a header mounted around the upper periphery of said cntainer, means for introducing liquid coolant into said header, a plurality of pipes depending from and in communication with said header, said pipes extending around the upper inner periphery of said container, and a plurality of spray nozzles each connected to one end of said pipes and in communication therewith for spraying liquid coolant into the interior of said container in contact with vapors therein for condensing said vapors.

36. A device as defined in claim 35, including means for maintaining a vacuum in said container.

37. A device as defined in claim 33, including an enclosure within said container and around said rotatable shaft and said nozzles mounted thereon, and means on said enclosure for separating liquid droplets from the gas in the mixture discharged from said nozzles, and permitting passage of said gas outwardly from said enclosure into said container.

38. A device as defined in claim 33, said container being a substantially cylindrical or spherical container, and including a ring shaped wall surrounding and enclosing said rotatable shaft and said nozzles mounted thereon, said wall having a diameter less than the diameter of said container and forming an annular space between said wall and the inner surface of said container, said wall extending from the bottom of said container upwardly a distance less than the height of said container, a plurality of apertured baffle plates mounted at the top of said wall, said baffle plates being spaced vertically from each other for separation of gas and liquid droplets from the mixture discharged from said nozzles into the enclosure formed by said wall, causing liquid droplets to be retained in this space within said enclosure and permitting gas to pass from said enclosure into a vapor space in said container above said baffles.

39. A device as define in claim 38, said condensing means comprising a header mounted around the upper periphery of said container, means for introducing liquid coolant into said header, a plurality of pipes depending from and in communication with said header, said pipes extending around the upper inner periphery of said container, and a plurality of spray nozzles each connected to one end of said pipes and in communication therewith for spraying liquid coolant into the interior of said container in contact with vapors therein for condensing said vapors.

40. A device as defined in claim 39, including steam ejector means connected to said container for maintaining a vacuum in said container.

41. A device as defined in claim 34, said convergent-divergent nozzles each having a length a length ranging from about 5 to about 10 feet, the diverging section of each of said nozzles having an angle of the wall of said section with its axis of about 10° to about 12°, the throat diameter of said nozzles ranging from about 0.1 to about 0.5 foot.

42. A device for converting the internal energy of hot fluids to mechanical work, which comprises a container, hollow rotatable shaft means mounted within said container, means for feeding a hot fluid into said hollow shaft means, at least one pair of nozzles mounted oppositely on said rotatable shaft means, means for feeding hot fluid from said hollow shaft means to said nozzles, passage of said hot fluid through said nozzles and discharge therefrom being capable of delivering a rotary thrust to said hollow shaft means and causing rotation thereof, transmitting means for transmitting the work generated by said rotatable shaft means to a machine, said transmitting means connected to said shaft means, means for removing fluid discharged from said nozzles, from said container, and means for maintaining a vacuum in said container.

43. A device for converting the internal energy of hot fluids to mechanical work, which comprises a container, hollow rotatable shaft means mounted within said container, means for feeding a hot fluid into said hollow shaft means, at least one pair of nozzles mounted oppositely on said rotatable shaft means, means for feeding hot fluid from said hollow shaft means to said nozzles, passage of said hot fluid through said nozzles and discharge therefrom being capable of delivering a rotary thrust to said hollow shaft means and causing rotation thereof, transmitting means for transmitting the work generated by said rotatable shaft means to a machine, said transmitting means connected to said shaft means, and means for removing fluid discharged from said nozzles, from said container, including an enclosure within said container and around said rotatable shaft means and said nozzles mounted thereon, and means connected to said enclosure for separating liquid droplets from the gas in the mixture discharged from said nozzles, and permitting passage of said gas outwardly from said enclosure into said container.

44. A device as defined in claim 43, said enclosure being a ring shaped wall extending upwardly from the bottom of said container a distance less than the height of said container and providing a vapor space in said container above the top of said wall, said separating means comprising baffle means mounted at the top of said wall.

45. A device as defined in claim 44, said baffle means comprising a plurality of aperatured plates mounted in spaced vertical relation at the top of said wall.

46. A device for converting the internal energy of hot fluids to mechanical work, which comprises a container, hollow rotatable shaft means mounted within said container, means for feeding a hot fluid into said hollow shaft means, fluid expansion means mounted on said rotatable shaft means and capable of rotating said shaft means, means for feeding hot fluid from said hollow shaft means to said fluid expansion means, passage of said hot fluid through said expansion means and discharge therefrom being capable of delivering a rotary thrust to said hollow shaft means and causing rotating thereof, transmitting means for transmitting the work generated by said rotatable shaft means to a machine, said transmitting means connected to said shaft means, condensing means in said container for condensing vapors in the mixture discharged from said expansion means, and means for removing fluid discharged from said expansion means, from said container.

47. A device as defined in in claim 46, including means for maintaining a vacuum in said container.

* * * * *